Feb. 20, 1968  R. H. BURG ETAL  3,369,520

IMPACT SENSOR DEVICE

Filed Nov. 24, 1965  3 Sheets-Sheet 1

INVENTORS
RAYMOND H. BURG
KARL H. DOERINGSFELD
BY  RUSSELL L. HOLLAND

Roger W. Jensen
ATTORNEY

Feb. 20, 1968   R. H. BURG ETAL   3,369,520
IMPACT SENSOR DEVICE
Filed Nov. 24, 1965   3 Sheets-Sheet 2
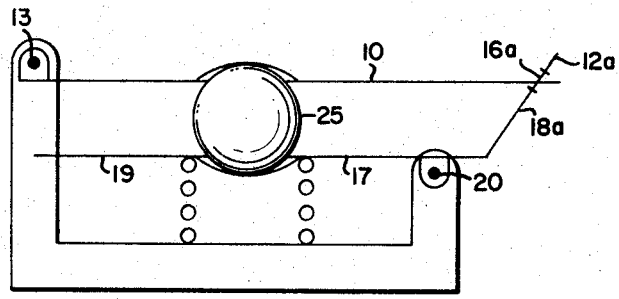
FIG.5
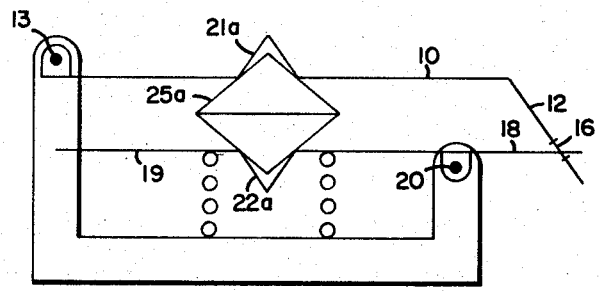
FIG.6
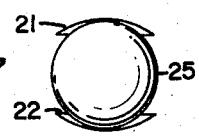
FIG.7
FIG.8
INVENTOR.
RAYMOND H. BURG
KARL H. DOERINGSFELD
BY   RUSSELL L. HOLLAND
Roger W. Jensen
ATTORNEY

INVENTORS
RAYMOND H. BURG
KARL H. DOERINGSFELD
BY  RUSSELL L. HOLLAND

ATTORNEY

United States Patent Office
3,369,520
Patented Feb. 20, 1968

3,369,520
IMPACT SENSOR DEVICE
Raymond H. Burg, Hopkins, Karl H. Doeringsfeld, Edina, and Russell L. Holland, Anoka, Minn., assignors to Honeywell Inc., Minneapolis, Minn., a corporation of Delaware
Filed Nov. 24, 1965, Ser. No. 509,474
9 Claims. (Cl. 116—114)

The present invention relates in general to inertial force sensors and in particular to an omnidirectional impact sensor that will provide a unidirectional output.

Inertial sensors of the type described herein are designed to respond instantaneously to a sudden acceleration or deceleration of a predetermined magnitude. One common application of such devices is in the field of munition fuzing, especially in those applications in which the munition must be armed or detonated upon impact with the ground. The typical impact sensor disclosed by the prior art utilizes a movable seismic mass that is biased to a normal position by compressed springs or magnetic attraction. This seismic mass is often shaped in the form of a cylinder or ball and is constrained to move through a closed chamber against the restraining force of the biasing means upon the receipt of an inertial force from the proper direction. Means are also provided to sense the movement of the seismic mass from the normal position upon impact. The inertial sensor may provide a switching action if used with an electrical system or it may provide a mechanical output if utilized with a purely mechanical system.

The majority of inertial sensors or impact switches are designed to be responsive only to inertial forces applied from a single direction. Such devices are useable only in vehicles that are always oriented in the same direction at the time the inertial force is received. Such devices cannot be used in a vehicle that is not designed to be oriented in a specific manner at the time the inertial force is received. In munitions such as grenades, for example, which often are not oriented to strike the target in one specific manner, an impact sensor must be used that is responsive to a given inertial force applied from any direction. The present invention is designed for use in such applications since it is capable of performing its function upon the receipt of an inertial force from any direction.

The prior art discloses that omnidirectional impact sensors per se are not new. Many devices have been designed that will provide an output regardless of the orientation of the devices, however, is that only an electrical output in the form of a switching action is available. An example of this type of device is shown in the Mintz Patent 2,881,276 that issued Apr. 7, 1959. The Mintz patent discloses an all-ways acceleration switch that will close an electric circuit when the desired acceleration is detected. Specifically, the Mintz patent discloses an acceleration switch wherein a central conducting sphere is spring positioned within a conducting spherical cavity in such a manner that acceleration of the structure in any direction will result in a displacement of the sphere within the cavity with resulting contact between the sphere and the cavity walls. The contact of the sphere with the cavity wall closes an electrical circuit to operate the munition in the desired manner. The Mintz patent is typical of prior art omnidirectional impact sensors in that only an electrical output is available. Such a structure is incapable of providing a unidirectional mechanical output that can be used to provide a mechanical operating function.

In many munition fuzing applications, it is desirable to eliminate electrical circuitry and rely entirely upon mechanical functioning. In such a system, the impact sensor might provide a mechanical output that would directly release a firing pin upon impact. Impact sensors operating on the principle disclosed by the Mintz patent cannot be utilized in such applications since they provide an omnidirectional output. Even though a particular device may provide omnidirectional sensing, it would not be useful in a strictly mechanical operation unless it could also provide a unidirectional output.

The present invention is designed to provide omnidirectional impact sensing but only a unidirectional output. Regardless of the direction from which the inertial force is received, a mechanical output in a single direction results. This unidirectional output may be used directly to arm the fuze or to detonate the munition. This same mechanical output may be utilized to provide an electrical switching function if that is desired.

It is therefore a primary object of the present invention to provide an omnidirectional inertial force sensor having a unidirectional output.

Other objects of this invention will be apparent from the specification and claims when considered in connection with the accompanying drawings in which:

FIGURE 5 illustrates an alternate embodiment of the sensor disclosed in FIGURE 1;

Figure 1:
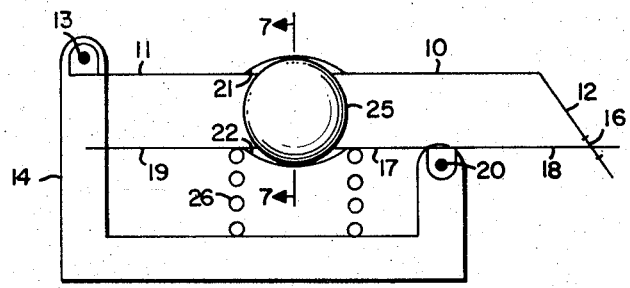
FIGURE 1 is a schematic drawing of an inertial sensor according to the present invention shown in the normal position.

FIGURE 6 discloses an alternate embodiment of the sensor disclosed in FIGURE 1 in which the shape of the seismic mass has been changed;

FIGURE 7 discloses a sectional view of the sensor taken along lines 7—7 of FIGURE 1;

FIGURE 8 discloses a top view of the sensor disclosed in FIGURE 1; and

Figure 9:
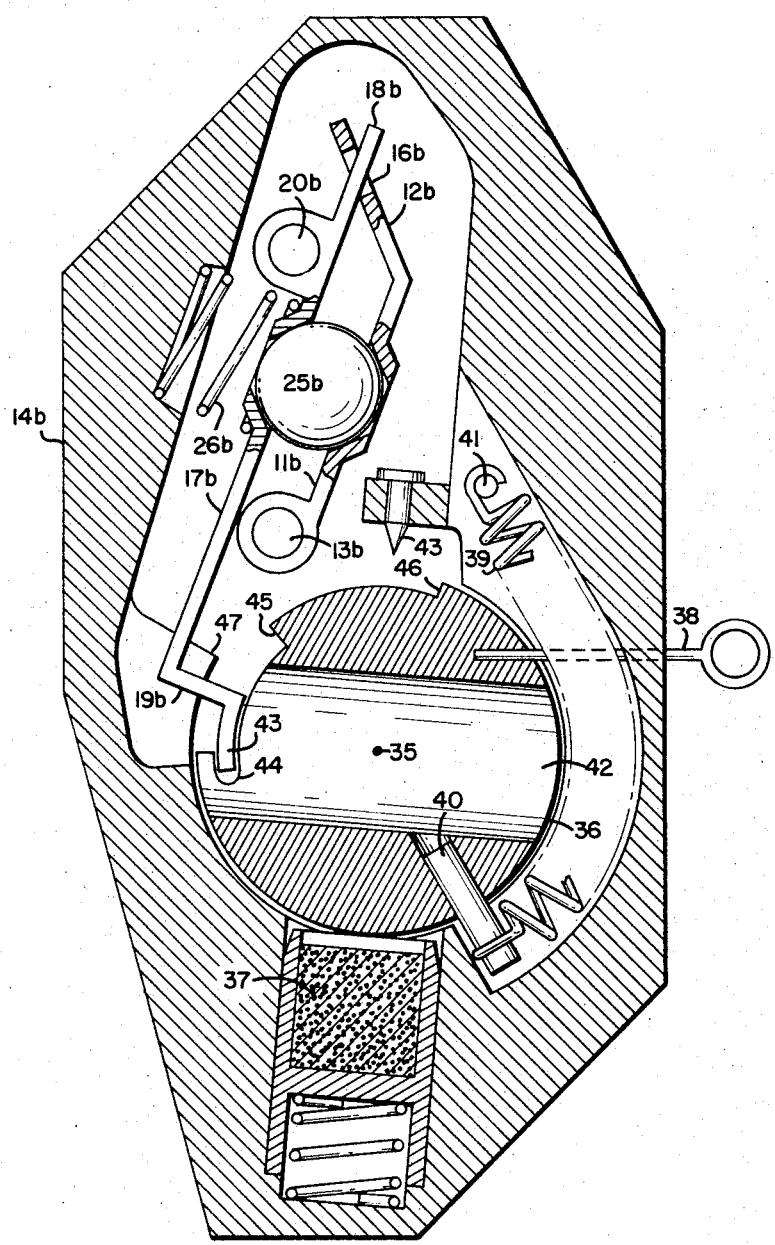

FIGURE 9 discloses a side view of the preferred embodiment of our invention incorporated in a munition fuze.

Referring now to FIGURE 1, there is disclosed a schematic side view of the present invention. The device includes a first arm member 10 having a first end 11 and a second curved end 12. Arm member 10 is mounted to pivot in a plane about a pivot pin 13 extending through first end 11. Pivot pin 13 is mounted in a frame, portions of which are shown schematically at 14. As previously mentioned, arm member 10 is pivotable about pin 13 in a single plane corresponding to the place in which the drawing is made. Curved end portion 12 lies in the same plane. A slot 16 is formed in end portion 12, also lying in the same plane. The relationship of arm member 10, pivot pin 13, and slot 16 is shown more clearly in the top view of FIGURE 8.

The device also includes a second arm member 17 having a third end 18 and a fourth end 19. Arm member 17 is pivotable in the same plane about a pivot pin 20 that is mounted in frame 14. Pivot pin 20 extends through arm member 17 at a point intermediate the ends thereof. Third end 18 of arm member 17 extends through slot 16. Arm member 10 and arm member 17 are thus mounted generally parallel to each other in the normal position with first end 11 lying adjacent fourth end 19.

Formed at an intermediate point on first arm member 10 is a concave cup or cavity 21 that faces second arm member 17. A second concave cup 22 is formed in second arm member 17 between pivot pin 20 and fourth end 19. Cup 22 is located directly in line with cup 21 to form a receptacle for an inertial member or seismic mass 25.

In the preferred embodiment of the invention, inertial member 25 is in the form of a spherical ball having a diameter that corresponds to the distance between cup 21 and cup 22. Again in the preferred embodiment, the radius of curvature of cups 21 and 22 is larger than the radius of ball 25 so that the ball does not fully fill the cups.

A coiled spring 26 is mounted between second arm member 17 and frame 14 opposite cup 22 from ball 25 to force arm member 17 against ball 25 and to force ball 25 against arm member 10. Under normal conditions, spring 26 tends to pivot arm member 17 in a clockwise direction about pin 20 against ball 25. Third end 18 extending through slot 16 tends to also pivot arm member 10 in a clockwise direction about pin 13 and also against ball 25. The position shown in FIGURE 1 results from the interaction of these forces. Ball 25 is held tightly between cups 21 and 22 while arm members 10 and 17 lie virtually parallel to each other. Fourth end 19 need not be in contact with frame 14 to maintain this equilibrium position.

Because of the configuration disclosed in FIGURE 1 and of the force provided by spring 26, ball 25 tends to remain centered in cups 21 and 22 under normal gravity conditions. The relationship between ball 25 and cups 21 and 22 is more clearly shown in FIGURES 7 and 8. The exact structure of the ball and of the cups is not critical to the invention, however, since various modifications would occur to those skilled in the art.

Figure 2:
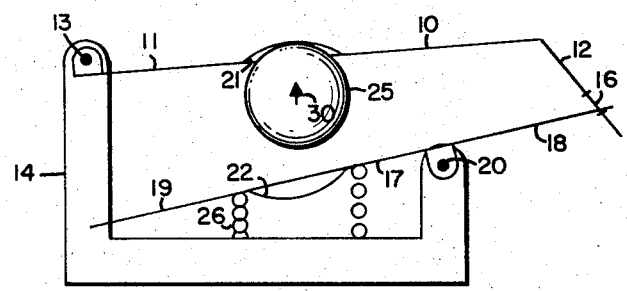
FIGURE 2 illustrates the position of the sensor after an upward inertial force has been received.

FIGURE 2 illustrates the movement of the inertial sensor upon application of an inertial force in an upward direction as shown by arrow 30. When the force is applied in an upward direction, ball 25 moves with the force to pivot arm member 10 in a counterclockwise direction. End portion 12 thus moves upwardly carrying end portion 18 with it. Arm member 17 thus pivots in a counterclockwise direction about pin 20 to compress spring 26. Fourth end 19 of arm member 17 is thus forced downwardly by the upwardly applied inertial force. This movement of end 19 can be used to initiate the arming sequence or can be used to detonate the munition.

Figure 3:
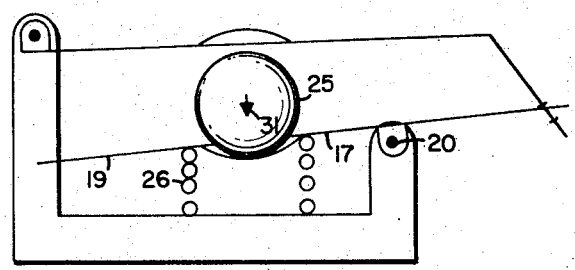
FIGURE 3 illustrates the position of the sensor after a downward inertial force has been received.

FIGURE 3 illustrates the action of the subject invention when a downward inertial force is applied as shown by arrow 31. Ball 25, in response to the inertial force, moves downwardly against arm member 17 to pivot it in a counterclockwise direction about pin 20 to compress spring 26. Again, end 19 moves downwardly in response to the inertial force.

Figure 4:
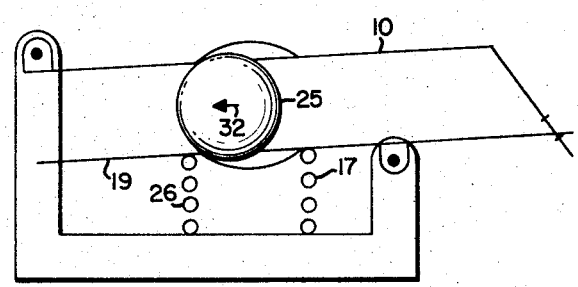
FIGURE 4 illustrates the position of the sensor after receipt of a laterally directed inertial force.

FIGURE 4 illustrates the movement of the inertial sensor that ocurs when a lateral inertial force is applied to the ball. In this particular situation, the inertial force as represented by arrow 32 is applied in the plane of movement of the arm members but in parallel with the arm members. Ball 25 thus moves to the left as viewed in FIGURE 4 to force apart arm members 10 and 17. Arm member 10 is forced upwardly by ball 25 while arm member 17 is forced downwardly. Both of these movements of the arm members act to compress spring 26 to again cause downward motion of end 19. It is obvious from the construction of this device that any movement of ball 25 in response to inertial forces will displace at least one of the arm members 10 and 17. This displacement will always result in a counterclockwise rotation of both members about their respective pivot points. This in turn always results in a downward movement of end 19. End 19 thus always moves in the same direction in the same plane regardless of the direction from which the inertial force is applied. A unidirectional output is thus achieved from an omnidirectional input.

FIGURE 5 shows schematically an alternate embodiment of the invention disclosed in FIGURE 1. In this alternate embodiment, the connection between arm members 10 and 17 is reversed so that end portion 12A is now straight while end 18A is curved and slotted. End 12A now extends through slot 16A to slideably connect the two members. This embodiment of the invention will operate exactly as described for the preferred embodiment shown in FIGURE 1. The invention is not limited to any specific method of connecting arm members 10 to 17. It is sufficient for purposes of the invention if the members are connected so that a pivotal motion of one member will result in a pivotal motion of the other member as previously described. At the same time, the particular connecting means utilized must allow some relative motion to occur between the two arm members so that they do not lock in any one position.

FIGURE 6 discloses schematically another embodiment of the invention. The embodiment of FIGURE 6 is identical to that disclosed in FIGURE 1 except for the shape of the seismic mass and the cavities for holding the mass. In this embodiment, mass 25A has the shape of two cones connected at the bases. Cavities or cups 21A and 22A also have a concave conical shape. This structure will provide the same sequence of events as disclosed in FIGURES 1–4 for the preferred embodiment. The inventive concept is thus not limited to the particular shape of the seismic mass nor of the cavities used to hold the mass in its normal position. Other variations in the shape and size of these elements of the invention will occur to those skilled in the art.

FIGURE 9 discloses the preferred embodiment of our invention utilized as a means for initiating the detonation of a munition fuze upon impact. The fuze is mounted in a frame 14b that is machined or otherwise formed to hold the various components. Mounted in frame 14b for rotation about a central axis 35 is a rotor 36. A spring loaded detonator 37 is mounted in frame 14 adjacent rotor 36. In the safe position of the fuze disclosed in FIGURE 9, rotor 36 prevents movement of detonator 37 from the position shown. Rotor 36 is held in the safe position by a pin 38 that extends through a portion of frame 14b into rotor 36. A rotor spring 39 has one end connected to a pin 40 mounted in rotor 36 and the other end connected to a pin 41 mounted in frame 14b. When rotor 36 is released, spring 39 tends to drive the rotor in a counterclockwise direction.

Rotor 36 is shown in section to disclose a slot 42 that extends through the center of the rotor perpendicular to axis 35. Mounted on frame 14b opposite rotor 36 from detonator 37 is a firing pin 43. When rotor 36 is rotated 90° in a counterclockwise direction by spring 39, slot 42 permits detonator 37 to be driven through rotor 36 into firing pin 43 to detonate the munition.

The inertial sensor used in the fuze is essentially the same as that disclosed in FIGURE 1 except for the fact that end 19b has a hook 43 formed thereon. Rotor 36 has a recessed slot 44 formed in the edge thereof. In the safe position of the fuze, hook 43 extends into slot 44 to lock the inertial sensor in the position shown. Under normal conditions the fuze can be handled without fear of accidental detonations since both rotor 36 and the inertial sensor are locked.

The sequence of operation of the fuze is as follows. When the munition is launched, pin 38 is removed either manually or automatically to release rotor 36. Rotor 36, under the influence of spring 39, rotates in a counterclockwise direction until a first stepped portion 45 thereof strikes the rear of heel 43. At this point, rotor 36 stops since further rotation is blocked by heel 43. At the same time, heel 43 is removed from slot 44 so that the inertial sensor is unlocked. When the fuze impacts with the ground in any orientation, ball 25b causes arm member 17b to pivot in a clockwise direction about pin 20b to compress spring 26b. This results in end 19b moving away from rotor 36. If sufficient inertial force is received, heel 43 clears first stop portion 45 to again release rotor 36. Rotor 36 then continues its counterclockwise rotation until a second stop portion 46 makes contact with frame 14b at point 47. At this time, slot 42 is aligned with detonator 37, which is driven into firing pin 43 to detonate the munition.

From the above description it will be apparent that we have invented a unique omnidirectional inertial force sensor that will provide a single unidirectional output. Several variations in the design of our invention have already been discussed herein. Further modifications may also be made without departing from the invention. For example, the motion of output end 19 can be made directly proportional to the motion of the ball by proper choice of the lengths of the arm members, the position of the pivot pins, and the shape of the cups. The motion of the ball may be amplified into a much larger motion of the output member by a proper selection of the various parameters. If desired, the device can be made more sensitive in one direction than in other directions by changing the leverage of the ball on the arm members. For these reasons, we do not intend to be limited by the disclosure but only by the scope of the appended claims.

We claim:
1. An omnidirectional impact sensor, comprising:
   (a) a frame;
   (b) a first arm member having first and second ends, said first arm member being pivoted in a plane about a pivot pin on said frame extending through said first end, said second end being curved so as to lie within said plane and having a longitudinal slot formed therein;
   (c) a second arm member mounted adjacent said first arm member and having third and fourth ends, said second arm member being pivoted in said plane about a second pivot pin mounted in said frame extending through said second arm member intermediate said ends, said third end of said second arm member extending through said slot in said second end of said first arm member;
   (d) a ball member responsive to inertia forces;
   (e) said first arm member having a first concave cup formed therein facing said second arm member;
   (f) said second arm member having a second concave cup formed therein between said second pivot pin and said fourth end facing said first cup, said ball member being mounted between said arm members in said cups; and
   (g) a coiled spring mounted between said second arm member and said frame opposite said second cup from said ball member to force said second arm member against said first arm member, an inertia force acting on said ball member from any direction causing said ball member to exert a force against at least one of said arm members to pivot said arm members in said plane to provide an output movement from said fourth end in a direction away from said first end.

2. Apparatus of the class described, comprising:
   (a) a frame;
   (b) a first arm member pivotally mounted on said frame about a first pivot point adjacent one end thereof;
   (c) a second arm member pivotally mounted on said frame about a second pivot point intermediate the ends thereof, said second arm member being mounted adjacent said first arm member, each of said arm members being pivotable in a single common plane;
   (d) an inertial member;
   (e) at least one of said arm members having a cavity formed therein between said pivot points and facing said other arm member, said inertial member being mounted between said members in said cavity;
   (f) means for slidably connecting said arm members together at a point opposite said second pivot point from said cavity so that a pivotal movement of one arm member in response to movement of said inertial member pivots said other arm member; and
   (g) biasing means mounted between said frame and said second arm member to resiliently force said second arm member against said inertial member and said inertial member against said first arm member.

3. The apparatus of claim 2 in which said inertial member is a ball member and in which both of said arm members have concave cavities formed therein facing each other to define a receptacle for said ball member, an inertial force acting on said ball member from any direction causing said ball member to exert a force against at least one of said arm members to pivot said arm members in said plane to provide an output movement from said second arm member.

4. The apparatus of claim 2 in which said means for slidably connecting said arm members comprises at least one of said arm members having a curved end intersecting said adjacent end of said other arm member, one of said intersecting ends having a slot formed therein, said other intersecting end extending through said slot.

5. The apparatus of claim 2 of which said means for slidably connecting said arm members includes a slot in one of said arm members through which said other arm member passes thereby permitting sufficient relative movement between said arm members to prevent locking of said apparatus.

6. The apparatus of claim 2 in which each of said arm members have concave conical cavities formed therein to define a receptacle for said inertial member.

7. The apparatus of claim 2 in which said inertial member is a spherical ball member.

8. The apparatus of claim 2 in which said biasing means is a coiled spring.

9. The apparatus of claim 2 in which means are provided to detect the movement of the free end of said second arm member to thereby indicate the application of a predetermined level of inertial force on said apparatus.

No references cited.

LOUIS J. CAPOZI, *Primary Examiner.*